3,296,161
CURABLE ORGANOPOLYSILOXANE
Theodore A. Kulpa, Cohoes, N.Y., assignor to General Electric Company, a corporation of New York
No Drawing. Filed Apr. 1, 1965, Ser. No. 444,797
7 Claims. (Cl. 260—18)

This invention relates to organopolysiloxanes which are capable of curing at room temperature to rubbery materials and in particular this invention is directed to materials commonly referred to as room temperature vulcanizing silicones which cure at room temperature upon exposure to moisture commonly present in the atmosphere.

These room temperature vulcanizing silicone rubbers are known in the art and are described, among other places, in Patents 3,035,016, 3,077,465, 3,105,061 and 3,133,891. These materials generally are prepared by mixing an organopolysiloxane, which is primarily a diorganopolysiloxane, containing silicon-bonded hydroxyl groups with an organotriacyloxysilane either in the presence or absence of added fillers and added vulcanization accelerations.

While these one-package room temperature vulcanizing silicone elastomers are extremely useful and are commercially successful, the adhesion of these materials to certain types of surfaces provides a continuing problem. While a number of solutions to such adhesion problems have been suggested, the adhesion of the available materials to materials such as glass or acrylic surfaces and particularly to stainless steel and aluminum surfaces has not been completely satisfactory.

It is an object of the present invention to provide an improved one-package room temperature vulcanizing silicone elastomer.

It is a further object of my invention to provide a one-package room temperature vulcanizing silicone rubber of improved adhesion.

It is a still further object of my invention to provide a room temperature vulcanizing silicone rubber which cures to the solid, elastic state upon exposure to atmospheric moisture and which exhibits improved adhesion to stainless steel and aluminum surfaces.

These and other objects of my invention will be apparent from the following description of my invention taken in connection with the appended claims.

My invention is based on the discovery that the addition of a dialkoxydiacyloxysilane having the formula:

(1) $(RO)_2Si(OY)_2$ where R is a lower alkyl radical and Y is a saturated aliphatic monoacyl radical of a carboxylic acid, to certain classes of known room temperature vulcanizing silicone rubber compositions leads to products of greatly improved adhesion to stainless steel and aluminum as well as to surfaces such as glass and acrylic resins.

In particular, the compositions of the present invention comprise (A) a liquid organopolysiloxane having a viscosity of from about 200 to 500,000 centistokes at 25° C. and containing from 0.02 to 2.0 percent by weight silicon-bonded hydroxyl groups, (B) an organotriacyloxysilane having the formula:

(2) $R'Si(OY)_3$ where R' is a member selected from the class consisting of monovalent hydrocarbon radicals, halogenated monovalent hydrocarbon radicals, and cyanoalkyl radicals and Y is as previously defined. As optional components, the compositions of the present invention can comprise a filler and a cure accelerator which comprises a carboxylic acid salt of a metal ranging from lead to manganese, inclusive, in the electromotive series of metals.

The compositions of the present invention are stable for several years at room temperature in the absence of moisture, but upon exposure to moisture normally present in the atmosphere, the compositions cure to a tack-free state within about one-half hour and are completely cured to solid, elastic silicone rubbers within about 24 hours.

As mentioned above, the key to the improved adhesion of the compositions of the present invention is found in the incorporation in the compositions of the dialkoxydiacyloxysilanes of Formula 1. These silanes are readily prepared from known compositions and generally their simplest method of preparation involves the reaction of silicon tetrachloride with the anhydride of the acid represented by Y in Formula 1. For example, in the preparation of silanes within the scope of Formula 1 wherein Y is acetoxy, silicon tetrachloride is reacted with acetic anhydride to produce silicon tetraacetate. The silicon tetraacetate is then reacted with an appropriate alcohol to produce a composition within the scope of Formula 1. For example, where the desired compound is di-t-butoxy diacetoxysilane, silicon tetraacetate is reacted with t-butyl alcohol to provide the desired product.

In Formula 1 above, the group represented by R is a lower alkyl radical, by which is meant an alkyl radical containing from 1 to 8 carbon atoms such as, for example, methyl, ethyl, propyl, butyl, t-butyl, hexyl, octyl, 2-ethyl hexyl, etc., radicals. The acyl radical represented by Y is a saturated aliphatic monoacyl radical of a carboxylic acid. Illustrative of the desired radicals are those in which the acyl radical contains up to 4 carbon atoms, such as formyl, acetyl, propionyl, and butyryl radicals. However, the acyl groups can also be represented by groups such as hexoyl, 2-ethyl hexoyl, octanoyl, isovaleryl, stearyl, etc. Illustrative of specific silanes within the scope of Formula 1 can be mentioned, for example, dimethoxydiformoxysilane, diethoxydiformoxysilane, dipropionoxydiacetoxysilane, di-t-butoxydiacetoxysilane, di-2-ethylhexoxydioctanolsilane, etc.

The liquid organopolysiloxanes employed in the practice of the present invention are well known in the art and form the "base polymer" for the room temperature vulcanizing silicone rubbers of the invention. These base polymers, which can comprise a single species or a plurality of species, are liquids having a viscosity of from about 200 to 500,000 centistokes at 25° C., which contain an average of from about 1.85 to 2.01 silicon-bonded organic radicals per silicon atom, with the organic radicals being selected from the class consisting of monovalent hydrocarbon radicals, halogenated monovalent hydrocarbon radicals and cyanoalkyl radicals, with the organic radicals being attached to silicon through silicon-carbon linkages and with there being present in the base polymer from about 0.02 to 2.0 percent by weight silicon-bonded hydroxyl groups.

Generally speaking, these compositions comprise primarily diorganosiloxane units, but can also contain minor amounts of monoorganosiloxane units and triorganosiloxane units. One particularly useful type of liquid organopolysiloxane base polymer is the material having the formula:

(3) 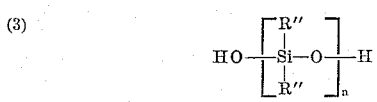

where R" is a member selected from the class consisting of monovalent hydrocarbon radicals, halogenated monovalent hydrocarbon radicals and cyanoalkyl radicals and n has a value of at least 5, e.g., from about 20 to 3,000 or more. The liquid organopolysiloxane within the scope of Formula 3 can comprise a variety of molecules of different molecular weights and of different R" substituents so long as the average formula of the reaction mixture falls within the scope of Formula 3.

In addition to the linear silanol chain-stopped diorganopolysiloxanes of Formula 3, the base polymer can also contain some molecules containing linear diorganosiloxane chains which are terminated at one end with triorganosiloxane units having the formula:

(4)  $(R'')_3SiO_{0.5}$ with the other end of the chains being terminated by silanol groups, where R'' is as previously defined. The polymer chains can also contain some molecules containing monoorganosiloxane units having the formula:

(5)  $R''SiO_{1.5}$ where R'' is as previously defined. In any case, it is necessary that the fluid organopolysiloxane base polymer have a viscosity in the range of from about 200 to 500,000 centistokes as previously described and preferably in the range of from about 2,000 to 50,000 centistokes at 25° C., with the amount of silicon-bonded hydroxyl groups being equal to at least about from 0.02 to 2.0 percent by weight. These various liquid organopolysiloxanes are well known in the art and their preparation need not be described in the present application.

Illustrative of the groups previously defined as selected from the class consisting of monovalent hydrocarbon radicals, halogenated monovalent hydrocarbon radicals and cyanoalkyl radicals for R' of the organotriacyloxysilane of Formula 2 and for R'' of the fluid organopolysiloxane are, for example, alkyl radicals, e.g., methyl, ethyl, propyl, butyl, octyl, etc., radicals; aryl radicals, e.g., phenyl, naphthyl, tolyl, etc., radicals; aralkyl radicals, e.g., benzyl, phenylethyl, etc., radicals; alkenyl radicals, e.g., vinyl, allyl, etc., radicals; cycloaliphatic hydrocarbon radicals, e.g., cyclohexyl, cycloheptyl, cyclohexenyl, etc., radicals; various halogenated monovalent hydrocarbon radicals, such as, for example, chloromethyl, alpha-chloroethyl, beta-chloroethyl, chlorophenyl, dibromophenyl, trifluoromethylphenyl, trifluoromethylpropyl, etc., radicals; as well as cyanoalkyl radicals, such as, for example, cyanomethyl, beta-cyanoethyl, beta-cyanopropyl, gamma-cyanopropyl, omega-cyanobutyl, etc., radicals.

The preferred organo radicals represented by R'' in the fluid organopolysiloxanes employed in the practice of my invention are methyl and phenyl.

The organotriacyloxysilanes of Formula 2 are also well known in the art. In these materials the acyl radical represented by Y is of the scope previously described, with the preferred Y radicals being those containing up to 4 carbon atoms and with the preferred specific Y radicals being acetyl. The R' group of Formula 2 is of the same scope as described for the R'' groups of the fluid organopolysiloxane, but preferably is a lower alkyl radical, such as methyl, ethyl, propyl, butyl, octyl, etc., or is a simple aryl radical, such as phenyl or tolyl. The preferred specific composition within the scope of Formula 2 is methyltriacetoxysilane.

The room temperature vulcanizing silicone rubber compositions of the present invention are prepared by simply mixing the liquid organopolysiloxane base polymer with the dialkoxydiacyloxysilane and the organotriacyloxysilane. Since both the dialkoxydiacyloxysilane of Formula 1 and the organotriacyloxysilane of Formula 2 tend to hydrolyze upon exposure to the atmosphere, care is exercised to exclude moisture during the mixing of the several components. Likewise, care should be taken that the mixture of the organopolysiloxane base polymer, the dialkoxydiacyloxysilane and the organotriacyloxysilane is maintained under substantially anhydrous conditions if it is desired to store the mixture for an extended period of time in a liquid state prior to conversion of the material to the cured, solid, elastic silicone rubber state. On the other hand, if it is desired to permit the mixture to cure immediately upon addition of the dialkoxydiacyloxysilane and the organotriacyloxysilane to the liquid organopolysiloxane, no special precautions need be taken and the two materials can be merely mixed and placed in the form or shape which it is desired for the material to be cured.

The relative amounts of the organopolysiloxane base polymer, the dialkoxydiacyloxysilane, and the organotriacyloxysilane employed in producing compositions which, upon exposure to moisture, cure to the solid, elastic state, vary within fairly broad limits. Generally, the amount of organotriacyloxysilane of Formula 2 is from about 1.8 to 6.0 parts per 100 parts of the base polymer. The amount of the dialkoxydiacyloxysilane of Formula 1 varies from about 0.2 to 6 parts per 100 parts of the organopolysiloxane base polymer. In general, from 5 to 70 percent by weight of the total of the dialkoxydiacyloxysilane and the organotriacyloxysilane is the dialkoxydiacyloxysilane.

The temperature at which the dialkoxydiacyloxysilane of Formula 1 and the organotriacyloxysilane of Formula 2 are added to the reaction mixture is generally immaterial, with the addition generally being effected at a temperature of from about 20° to 80° C.

Compositions prepared by mixing the dialkoxydiacyloxysilane and the organotriacyloxysilane with the base polymer can be used without further modification in any sealing, caulking or coating application by merely placing the composition in the desired place and permitting it to cure upon exposure to the moisture present in the atmosphere. Upon exposure of such compositions to atmospheric moisture, even after storage for times as long as two years or more, a hard "skin" will form on a composition shortly after exposure and complete cure to the rubbery state will have been effected within about 24 hours, all at room temperature. The time required for the formation of such skin is generally on the order of 30 minutes.

It is often desirable to modify the compositions of the present invention by addition of various materials which act as extenders or which change various properties, such as cure rate, color, or cost. For example, if it is desired to reduce the time required for complete cure by a factor of from about 2 to 5 without affecting the work life of the room temperature vulcanizing composition, the composition can be modified by the incorporation of a minor amount of a carboxylic acid salt of a metal ranging from lead to manganese, inclusive, in the electromotive series of metals. The particular metals included within this scope are lead, tin, nickel, cobalt, iron, cadmium, chromium, zinc and manganese. The specific metal ion which is preferred is tin. The carboxylic acids from which the salts of these metals are derived can be monocarboxylic acids or dicarboxylic acids and the metallic salts can be either soluble or insoluble in the organopolysiloxane. Preferably, the salts employed are soluble in the organopolysiloxane since this facilitates the uniform dispersion of the salt in the reaction mixture.

Illustrative of metal salts which can be employed in the practice of the present invention are, for example, zinc naphthenate, lead naphthenate, cobalt naphthenate, iron 2-ethylhexoate, cobalt octoate, zinc octoate, lead octoate, chromium octoate and tin octoate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bistrichlorobenzoate, diphenyl lead diformate, dibutyl tin dilactate, dicyclopentyl lead bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n- propyl lead acetate, tristearyl lead succinate, trinaphthyl lead p-methylbenzoate, tris-phenyl lead cyclohexenyl acetate, triphenyl lead ethylmalonate, etc.

The amount of the metal salt of the organic carboxylic acid which can be employed in the practice of the present invention is a function of the increased rate of curing desired so that any amount of such salt up to the maximum effective amount for increasing the cure rate can be employed. In general, no particular benefit is derived from employing more than about 5% by weight of such metal salt based on the weight of the organopolysiloxane base polymer. Preferably, where such metal salt is employed, it is present in an amount equal to from about 0.01% to 2.0% by weight, based on the weight of the base polymer.

The compositions of the present invention can also be varied by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. When fillers are added to the compositions of the present invention, they are generally employed in amounts of from about 10 to 200 parts filler per 100 parts of the organopolysiloxane base polymer.

In addition to the modification of the compositions of the present invention by the addition of metal salt cure accelerators and fillers, these compositions can also be modified by the incorporation of various flame retardants, stabilizing agents and plasticizers. Suitable flame retardants include antimony oxide, various polychlorinated hydrocarbons and organic sulfonates.

Where the compositions of the present invention contain components other than the dialkoxydiacyloxysilane of Formula 1 and the organotriacyloxysilane of Formula 2 and the base fluid, the various ingredients can be added in any desired order. However, for ease of manufacturing it is often convenient to form a blend or mixture of all of the components of the room temperature vulcanizing organopolysiloxane except the dialkoxydiacyloxysilane and the organotriacyloxysilane, to then remove moisture from the resulting mixture by maintaining the mixture under vacuum, and thereafter to add the dialkoxydiacyloxysilane and the organotriacyloxysilane prior to packaging of the compositions in containers protected from moisture. In addition to more conventional containers for bulk amounts of these materials, the materials can be packaged for convenient usage in caulking cartridges, squeeze tubes, and the like. Of course, where it is desired to permit the curable composition to cure immediately upon formation, no special precautions need be taken during the addition of the dialkoxydiacyloxysilane and the organotriacyloxysilane and the mixture is allowed to cure immediately after the addition in the desired shape.

The room temperature vulcanizing silicone rubber compositions of the present invention are particularly adapted for caulking and sealing applications where adhesion to various surfaces is important. For example, these materials are useful in household caulking applications and in industrial applications, such as on buildings, factories, automotive equipment, and in applications where adhesion to masonry, plastic, metal, and wood is required. The materials are especially useful in applications where adhesion to stainless steel and aluminum surfaces is desired because of their markedly improved adhesion to various surfaces.

The following examples are illustrative of the practice of my invention and are not intended for purposes of limitation. All parts are by weight.

The t-butoxydiacetoxysilane used in the examples was prepared by the following procedure.

Silicon tetraacetate was prepared by adding 1700 parts silicon tetrachloride and 6650 parts acetic anhydride to a reaction vessel and heating until most of the theoretical amount of acetyl chloride had been distilled from the reaction mixture. The remaining acetyl chloride and the excess acetic anhydride were stripped off and silicon tetraacetate began to precipitate as fine white crystals. The reaction mixture was cooled and the crystals were washed three times with equal volumes of a toluene-hexane mixture and finally with hexane alone to produce silicon tetraacetate. To 205 parts of silicon tetraacetate was added 163 parts of t-butanol at room temperature. The reaction mixture was then heated to 70° C. for one hour and thereafter acetic acid by-product and excess alcohol were stripped from the reaction mixture. This resulted in a yield of 95% pure di-t-butoxydiacetoxysilane, which is a clear water white liquid.

*Example 1*

A liquid diorganopolysiloxane base polymer was prepared by mixing 100 parts of a silanol chain-stopped linear dimethylpolysiloxane having a viscosity of 3,000 centistokes at 25° C. and containing 0.09 weight percent silicon-bonded hydroxyl groups and 15 parts of a fluid organopolysiloxane having a viscosity of about 35 centistokes at 25° C. and comprising trimethylsiloxane units, dimethylsiloxane units and monomethylsiloxane units in the proportions of 2.1 mole percent trimethylsiloxane units, 74.4 mole percent dimethylsiloxane units, and 23.5 mole percent monomethylsiloxane units and containing about 0.5 percent by weight silicon-bonded hydroxyl groups. To 100 parts of this base polymer was added 15 parts of a finely divided fumed silica and 0.03 part of dibutyl tin dilaurate. To the resulting mixture was added varying amounts of di-t-butoxydiacetoxysilane and methyltriacetoxysilane. A 40-mil layer of the resulting material was subjected to a conventional lap shear test using a clad aluminum test bar or a stainless steel test bar.

In the lap shear test, the end one inch of a one inch wide aluminum or stainless steel strip is coated with a 40-mil coating of the composition under evaluation and a stainless steel screen is brought into contact with the other side of the composition. After the material is exposed to the atmosphere for 48 hours, the shear force required to pull the screen off the test strip is measured. Also measured is the percentage of the surface which is still coated with the cured composition. Ideally, the entire surface of the strip is coated with the cured silicone rubber and 100% of the failure is of the cohesive type. In some cases, only a portion of the test patch is still covered and the percentage covered is recorded as a measure of the cohesive failure. In the table below is listed the parts of di-t-butoxydiacetoxysilane (DTBDAS) and the parts of methyltriacetoxysilane (MTAS) added to the reaction mixture, both being based on 100 parts of the base fluid. The table also lists the force necessary to shear the screen from the aluminum or stainless steel surface and the percentage of cohesive failure for each composition.

TABLE I

| DTBDAS, Parts | MTAS, Parts | Aluminum | | Steel | |
| --- | --- | --- | --- | --- | --- |
| | | Force, p.s.i. | Cohesive Failure, Percent | Force, p.s.i. | Cohesive Failure, Percent |
| 0 | 4.0 | 157 | 45 | 129 | 10 |
| 0.4 | 3.6 | 226 | 100 | | |
| 0.8 | 3.2 | 239 | 100 | 253 | 100 |
| 1.2 | 2.8 | 222 | 100 | | |
| 0 | 6.2 | 144 | 35 | | |
| 0.6 | 5.6 | 200 | 100 | | |
| 1.2 | 5.0 | 238 | 100 | | |
| 1.9 | 4.3 | 227 | 100 | | |
| 3.1 | 3.1 | 277 | 100 | 200 | 100 |
| 3.7 | 3.7 | 250 | 100 | 195 | 100 |
| 4.4 | 3.0 | 206 | 100 | 217 | 100 |

As is obvious from the table, the use of methyltriacetoxysilane alone results in a material which breaks under stress at a relatively low force and which does not exhibit as high a degree of cohesive failure as desired. In comparison, in all of those cases in which both methyltriacetoxysilane and di-t-butoxydiacetoxysilane were present, the force required to break the lap joint was much higher and 100% cohesive failure was observed.

*Example 2*

A composition similar to that of the preceding example was prepared from 100 parts of the 3,000 centistoke silanol chain-stopped linear dimethylpolysiloxane, 15 parts of the 35 centistoke copolymer of monomethylsiloxane, dimethylsiloxane and trimethylsiloxane units, and 15 parts of the finely divided fumed silica. The composition was varied by adding thereto one part of finely divided titanium dioxide to produce a white-colored product. To this mixture was added 0.03 part dibutyl tin dilaurate, 3.6 parts of methyltriacetoxysilane and 1.0 part of di-t-butoxydiacetoxysilane. In the lap shear test this composition required a force of 135 p.s.i. to shear the screen from the aluminum, and all of the failures were 100% cohesive. On the other hand, when a formulation identical to the above was prepared except that the di-t-butoxydiacetoxysilane was omitted, the force was down to about 80 p.s.i. and the failures were only 0 to 20% cohesive.

*Example 3*

An organopolysiloxane base fluid is prepared by mixing 50 parts of a 2,500 centistoke silanol chain-stopped dimethylpolysiloxane, 50 parts of a 3,500 centistoke silanol chain-stopped copolymer of dimethylsiloxane units and diphenylsiloxane units containing approximately 5 mole percent diphenylsiloxane units. This mixture contains an average of 0.1% silicon-bonded hydroxyl groups. To this base fluid is added 15 parts of finely divided fumed silica, 5 parts of finely divided carbon black, 0.05 part dibutyl tin dilaurate, 3.0 parts of ethyltripropionoxysilane, and 3.0 parts of dimethoxydiacetoxysilane. The dimethoxydiacetoxysilane is prepared by reacting one mole of silicon tetraacetate with 2.2 moles of methanol at a temperature of 30° C. and maintaining the reaction mixture at this temperature for approximately 2 hours. At the end of this time the reaction mixture is stripped of acetic acid and distilled to produce dimethoxydiacetoxysilane which is a clear, colorless liquid having a boiling point of 54 to 57° C. at 0.6 mm. Hg.

When the above composition is given the lap shear test using a stainless steel test strip, a force of over 200 p.s.i. is required to pull the test pieces apart and the failure is 100% cohesive. With the same composition, but omitting the dimethoxydiacetoxysilane, the force required is less than 100 p.s.i. and the failures are less than 50% cohesive.

*Example 4*

A curable composition was prepared by mixing 25 parts of finely divided fumed silica into 100 parts of a 3,600 centistoke liquid organopolysiloxane which was a copolymer containing 0.5 mole percent trimethylsiloxane units, 4.5 mole percent diphenylsiloxane units, 95 mole percent dimethylsiloxane units and containing 0.07 percent, by weight, silicon-bonded hydroxyl groups. To a portion of this mixture was added 0.015 part dibutyl tin dilaurate and 5 parts methyltriacetoxysilane per 100 parts of the liquid organopolysiloxane to form a control. To another portion of this mixture was added 0.015 part dibutyl tin dilaurate, 4 parts methyltriacetoxysilane and 5 parts di-t-butoxydiacetoxysilane per 100 parts of the liquid organopolysiloxane. Samples of each of these compositions were applied in a 40-mil layer to a strip of aluminum having a surface coating of thoroughly cured acrylic lacquer. A strip of stainless steel screen was bonded to the lacquer through the curable composition and the resulting assembly was allowed to cure for three days. At the end of this time the peel strength of the two samples were examined. The control showed a peel strength of 7.5 pounds per inch with only 5% of the failure being cohesive. In contrast, the other material showed a peel strength of 27.3 pounds per inch and the failure was 92% cohesive.

While the foregoing examples have illustrated certain of the embodiments of my invention, it should be understood that my invention is directed broadly to a wide range of compositions curable upon exposure to atmospheric moisture, the essential components of which are a liquid organopolysiloxane having the curing characteristics described above, an organotriacyloxysilane of Formula 2 and a dialkoxydiacyloxysilane having the characteristics described in connection with the material of Formula 1.

What I claim as new and desire to secure by Letters Patent of the United States is:

1. A composition stable under anhydrous conditions and convertible to the solid, cured elastic state upon exposure to moisture comprising by weight (A) 100 parts of a substantially liquid organopolysiloxane having a viscosity of from about 200 to 500,000 centistokes at 25° C., containing an average of from 1.85 to 2.01 organic groups per silicon atom, and containing from 0.02 to 2.0% silicon-bonded hydroxyl groups, (B) from 0.2 to 6.0 parts of a dialkoxydiacyloxysilane having the formula, $$(RO)_2Si(OY)_2$$

and from 1.8 to 6.0 parts of an organotriacyloxysilane having the formula, $$R'Si(OY)_3$$

where the organo groups of the organopolysiloxane and the organo groups represented by R' are members selected from the class consisting of monovalent hydrocarbon radicals, halogenated monovalent hydrocarbon radicals and cyanoalkyl radicals, R is a lower alkyl radical and Y represents a saturated aliphatic monoacyl radical of a carboxylic acid.

2. A composition in accordance with claim 1 in which R is t-butyl, R' is methyl and Y is acetyl.

3. A composition stable under anhydrous conditions and convertible to the solid, cured, elastic state upon exposure to atmospheric moisture comprising (A) a liquid methylpolysiloxane having an average of from 1.85 to 2.01 methyl groups per silicon atom, having a viscosity at 25° C. of from 200 to 500,000 centistokes, having from 0.02 to 2.0 percent by weight of silicon-bonded hydroxyl groups, (B) an organotriacyloxysilane having the formula, $$R'Si(OY)_3$$

and (C) dialkoxydiacyloxysilane having the formula, $$(RO)_2Si(OY)_2$$

where R is a lower alkyl radical, R' is a member selected from the class consisting of monovalent hydrocarbon radicals, halogenated monovalent hydrocarbon radicals, and cyanoalkyl radicals, and Y represents a saturated aliphatic monoacyl radical of a carboxylic acid.

4. A composition stable under anhydrous conditions and curable to a solid, elastic state upon exposure to moisture comprising by weight (A) 100 parts of a liquid methylpolysiloxane having a viscosity of from 200 to 500,000 centistokes at 25° C., having an average of from 1.85 to 2.01 methyl groups per silicon atom and containing from 0.02 to 2.0% by weight silicon-bonded hydroxyl groups, (B) from 1.8 to 6.0 parts of an organotriacyloxysilane having the formula, $$R'Si(OY)_3$$

and (C) from 0.2 to 6.0 parts by weight of a dialkoxydiacyloxysilane having the formula, $$(RO)_2Si(OY)_2$$

with the dialkoxydiacyloxysilane comprising from about 5 to 70 percent by weight of the total weight of an organotriacyloxysilane and the dialkoxydiacyloxysilane, where R is a lower alkyl radical, R' is a member selected from the class consisting of monovalent hydrocarbon radicals, halogenated monovalent hydrocarbon radicals and cyanoalkyl radicals, and Y is a saturated aliphatic monoacyl radical of a carboxylic acid.

5. A composition in accordance with claim 4 in which the methylpolysiloxane is a silanol chain-stopped linear dimethylpolysiloxane.

6. A composition stable under anhydrous conditions and convertible to the solid, cured, elastic state upon exposure to moisture normally present in the atmosphere comprising by weight (A) 100 parts of a liquid methylpolysiloxane having a viscosity of from about 200 to 500,000 centistokes at 25° C., and containing an average of from 1.85 to 2.01 methyl groups per silicon atom and containing from about 0.02 to 2.0 percent by weight silicon-bonded hydroxyl groups, (B) from 1.8 to 6.0 parts of methyltriacetoxysilane, and (C) from 0.2 to 6.0 parts of di-t-butoxydiacetoxysilane, with the di-t-butoxydiacetoxysilane being present in an amount equal to from about 5% to 70% by weight of the total of the di-t-butoxydiacetoxysilane and the methyltriacetoxysilane.

7. A composition stable under anhydrous conditions and convertible to the solid, cured, elastic state upon exposure to moisture normally present in the atmosphere comprising by weight (A) 100 parts of a methylpolysiloxane which is a liquid having a viscosity of from about 200 to 500,000 centistokes at 25° C. and having an average of from about 1.85 to 2.01 methyl groups per silicon atom and from about 0.02 to 2.0 percent by weight silicon-bonded hydroxyl groups, (B) from 1.8 to 6.0 parts of an organotriacyloxysilane having the formula, $$R'Si(OY)_3$$

(C) from 0.2 to 6.0 parts of a dialkoxydiacyloxysilane having the formula, $$(RO)_2Si(OY)_2$$

(D) a filler, (E) and from 0.01 to 2.0 parts of a carboxylic acid salt of a metal ranging from lead to manganese, inclusive, in the electromotive series of metals, where R is a lower alkyl radical, R' is a member selected from the class consisting of monovalent hydrocarbon radicals, halogenated monovalent hydrocarbon radicals and cyanoalkyl radicals, Y is a saturated aliphatic monoacyl radical of a carboxylic acid, and where the dialkoxydiacyloxysilane of (C) is present in an amount equal to from 5 to 70% by weight of the total of the dialkoxydiacyloxysilane of (C) and the organotriacyloxysilane of (B).

References Cited by the Examiner

UNITED STATES PATENTS

| 2,832,794 | 4/1958 | Gordon | 260—46.5 |
| 3,035,016 | 5/1962 | Bruner | 260—46.5 |
| 3,065,194 | 11/1962 | Nitzsche et al. | 260—18 |
| 3,077,465 | 2/1963 | Bruner | 260—18 |
| 3,105,061 | 9/1963 | Bruner | 260—46.5 |
| 3,127,363 | 3/1964 | Nitzsche et al. | 260—46.5 |
| 3,133,891 | 5/1964 | Ceyzeriat | 260—46.5 |

LEON J. BERCOVITZ, *Primary Examiner.*

DONALD E. CZAJA, *Examiner.*

M. I. MARQUIS, *Assistant Examiner.*